United States Patent [19]

Seely

[11] 4,303,325

[45] Dec. 1, 1981

[54] ROLL FILM AND A PHOTOGRAPHIC CAMERA FOR USE THEREWITH

[75] Inventor: Neil G. Seely, Rochester, N.Y.

[73] Assignee: Eastman Kodak Company, Rochester, N.Y.

[21] Appl. No.: 195,992

[22] Filed: Oct. 10, 1980

[51] Int. Cl.³ .................... B65H 75/28; G03B 17/26; G03B 1/24
[52] U.S. Cl. ..................................... 354/212; 242/74; 354/275
[58] Field of Search ............... 354/203, 275, 173, 217, 354/218, 212–215, 204, 202, 205, 206; 242/71, 71.1, 74, 74.1, 74.2

[56] References Cited

U.S. PATENT DOCUMENTS

| | | | |
|---|---|---|---|
| 1,930,144 | 10/1933 | Lee | 242/74 |
| 3,377,935 | 4/1968 | Furusawa | 354/212 |
| 3,377,936 | 4/1968 | Goshima et al. | 354/212 |
| 3,460,449 | 8/1969 | Eagle | 354/275 X |
| 3,619,050 | 11/1971 | Swanke | 355/16 |
| 3,724,776 | 4/1973 | McKee | 352/158 X |
| 3,925,798 | 12/1975 | Sanada et al. | 354/212 X |

FOREIGN PATENT DOCUMENTS

| | | |
|---|---|---|
| 1101946 | 3/1961 | Fed. Rep. of Germany ...... 354/215 |
| 1285293 | 12/1968 | Fed. Rep. of Germany ...... 354/275 |
| 2444106 | 3/1976 | Fed. Rep. of Germany ........ 242/74 |
| 2841607 | 4/1980 | Fed. Rep. of Germany ...... 354/275 |

*Primary Examiner*—Donald A. Griffin
*Attorney, Agent, or Firm*—D. I. Hague

[57] ABSTRACT

A roll film and a photographic camera cooperate to facilitate automatic attachment of the film to a rotatable film take-up spool. The roll film has a leader portion provided with a novel connecting aperture that includes a flexible tongue element which extends forwardly into the aperture. The camera includes a rotatable film take-up spool which is provided with a capturing member having a head surface, a leading edge surface and a trailing edge surface provided with a recess. The leading edge surface of the film capturing means engages the film aperture upon rotation of the take-up spool and the head surface flexes the tongue element sufficiently to allow the head surface to pass through the plane of the film. Further rotation of the take-up spool allows the tongue element to snap back into the trailing edge recess of the capturing member to secure the film to the take-up spool.

10 Claims, 10 Drawing Figures

ROLL FILM AND A PHOTOGRAPHIC CAMERA FOR USE THEREWITH

CROSS REFERENCE TO A RELATED APPLICATION

Reference is made to commonly assigned U.S. patent application Ser. No. 186,772, entitled Film Threading Apparatus, filed on Sept. 12, 1980 in the name of Donald M. Harvey.

BACKGROUND OF THE INVENTION

1. Field of the Invention

The present in vention relates to roll films and to photographic cameras for use therewith. More particularly, the invention relates to improvements in roll films and cooperating camera elements for automatically coupling the leading end of the film to a film take-up spool in a camera.

2. Description Relative to the Prior Art

When loading conventional 35 mm cameras with roll film, the operator must (1) insert the film cassette into a film supply chamber, (2) pull the film leader out of the cassette and position it along film guide rails that cooperate with other camera structure to define a film passageway extending between the supply chamber and a take-up chamber. (3) attach the end of the film leader to a film take-up spool rotatably mounted in the take-up chamber, (4) turn the film advance lever to wind the film around the take-up spool, making sure that the sprocket holes in the film are engaged in the teeth of the film transport sprocket, (5) close the camera back cover until it snaps shut, and (6) gently turn the film rewind crank to take up any film slack. If the film is not properly loaded, the operator must open the back cover, which may entail the loss of one or more exposure frames, and repeat the film loading procedure from the start. Many amateur photographers find this manual film loading procedure to be tedious, complicated and of uncertain result.

35 mm cameras provided with automatic film loading devices are known in the art. However, in the presently known devices, all the active components of the loading apparatus are provided by camera structure which acts upon a roll film fed into the film take-up chamber. For example, U.S. Pat. No. 3,377,936 to Takeshi Goshima et al discloses film-loading apparatus for 35 mm cameras in which the leading end of a standard 35 mm film strip, fed by means of a sprocket or the like, is automatically connected to a take-up spool by friction imparted by spring biased friction members provided on the spool.

It is also known to provide the leading end of a film or web with a shaped aperture which cooperates with machine structure during an automatic loading procedure. See, for example commonly assigned U.S. Pat. No. 3,724,776 to Edward S. McKee and U.S. Pat. No. 3,619,050 to Thaddeus Swanke respectively disclosing motion picture projector apparatus and electrophotographic copier apparatus. Here too, however, the apertured film or web is passive during loading and is merely acted upon by the apparatus in which it is used.

As a result of the purely passive role of the film or web in the prior art automatic loading techniques, the cooperating machine structure must be mechanically complex in order to ensure reliable connection of the film.

SUMMARY OF THE INVENTION

One aspect of the present invention resides in providing a leader portion of a roll film with a lobate aperture including a flexible tongue element extending forwardly into the aperture. The tongue element is adapted to be engaged and flexed by the enlarged head of a film capturing member extending upwardly from a rotating film take-up spool. The flexing of the tongue element allows the heat to pass through the aperture. Forther rotation of the take-up spool tensions the film and snaps the tongue back into a recess provided in the trailing edge of the capturing member, firmly securing the film leader to the take-up spool. Thereafter, the film cannot be removed from the capturing member except by again flexing the film leader as occurs during the film rewind operation. Thus, the film aperture configuration provides active participation of the film leader in the attachment procedure, via the movement of the flexible tongue, to achieve a simple, compact and reliable mechanism for connecting the film to the take-up spool.

A second aspect of the invention resides in providing cooperating photographic camera apparatus including a rotatable film take-up spool, a drive mechanism for the take-up spool, and a film capturing member mounted on the core of the take-up spool. The film capturing member has an enlarged head surface, a leading edge surface and a trailing edge surface that is recessed relative to the head surface. When a film roll is inserted into the camera, the film leader is delivered either manually or automatically to a position overlying the take-up spool. The initial rotation of the take-up spool by the drive mechanism causes the leading edge surface of the film capturing member to enter the aperture in the film leader, with a portion of the head surface engaging the lower surface of the tongue element. Further rotation of the take-up spool first tensions the film, urging the trailing end of the aperture toward the core of the take-up spool and causing the head surface of the capturing member to flex the tongue element upwardly out of the plane of the surrounding film leader. Subsequently the film is moved to a position whereat the tongue element snaps back to a substantially unflexed position in the recess of the trailing edge surface of the capturing member to secure the roll film to the take-up spool.

The invention and its features and advantages will become more apparent by referring to the accompaning drawings and to the ensuing detailed description of the preferred embodiment.

DETAILED DESCRIPTION OF THE PREFERRED EMBODIMENTS

Because roll films and photographic cameras are well known, the present description will be directed in particular to elements forming part of, or cooperating more directly with, apparatus in accordance with the present invention. It is to be understood that film elements and camera elements not specifically shown or described may take various forms well known to those having skill in the art.

Figure 1:
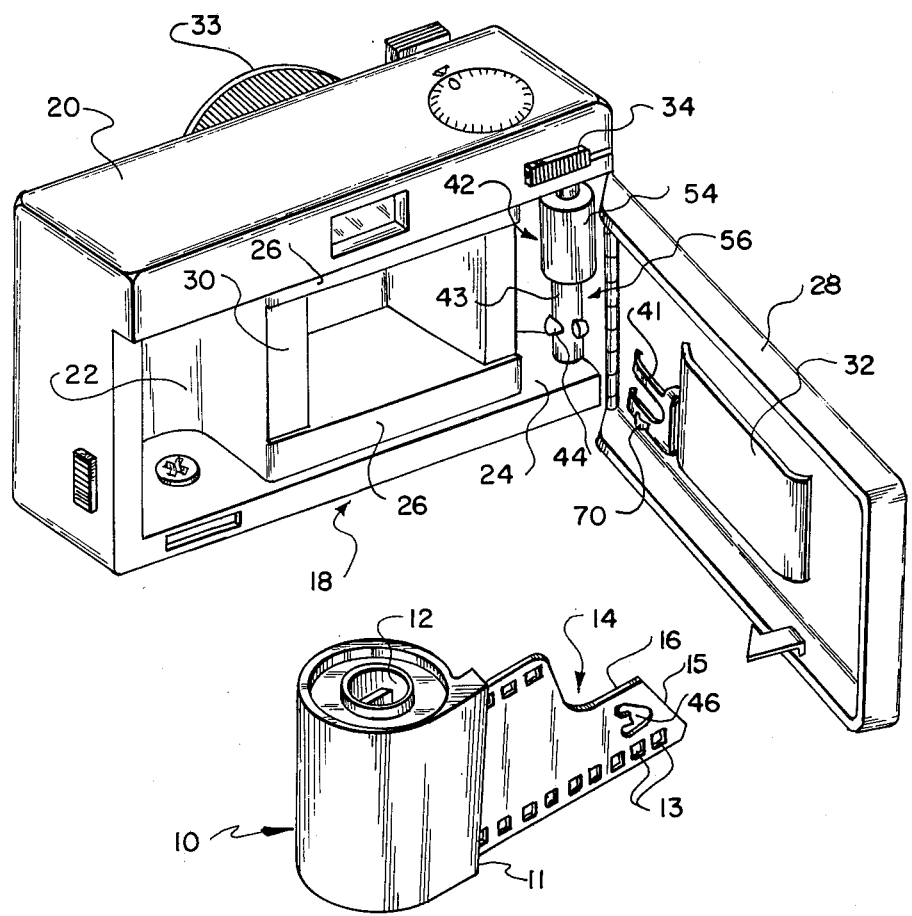
FIG. 1 is a perspective view of a roll film and of a photographic camera for use therewith according to the invention.

FIG. 1 of the drawings shows a film cassette 10 in position for insertion into a camera 18. The cassette 10 contains a roll of film coiled upon a spool 12 and having an elongated film leader 14 extending through a light-tight slot 11. Camera 18 includes a body portion 20 having a film supply chamber 22 and a film take-up chamber 24 arranged on opposite sides of a pair of film guide supports 26, and a camera cover door 28 which is hinged to the camera body 20 in a conventional manner. The guide supports 26 cooperate with a pressure plate 32 mounted on the interior of the camera door 28, to define a film passage way 30 extending between the supply and take-up chambers that maintains the film in a flat, properly oriented position in the focal plane of a camera objective lens 33.

Figure 2:
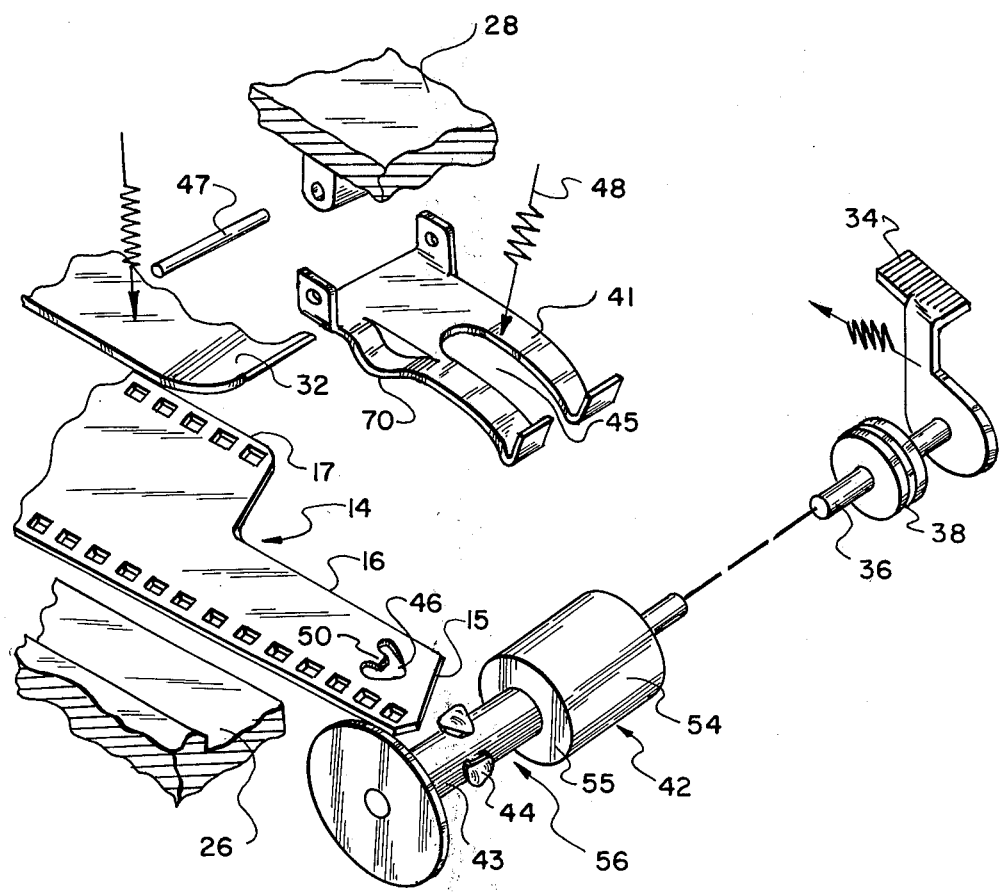
FIG. 2 is a fragmentary exploded view of components of the film securing mechanism.

In a semi-automatic film loading camera, shown in FIGS. 1 and 2, the camera 18 is loaded by (1) inserting the film cassette 10 into the film supply chamber 22, (2) pulling the film leader 14 out of the cassette 10 and positioning it between the guide supports 26 with the leading end 15 of the leader overlying the take-up chamber 24, (3) closing the cover door 28 so that the pressure plate 32 and a film guide member 41 bear against the film leader 14, and (4) advancing a film winding lever 34 coupled, via a shaft 36 and a slip clutch 38, to film take-up spool 42 rotatably mounted in the film take-up chamber 24. The rotation imparted to the take-up spool 42 by the winding lever 34, or by an automatic film transport mechanism described in the succeeding paragraph, enables one of a plurality of film capturing members 44 mounted on the core 43 of the take-up spool to positively secure the film leader 14 to the take-up spool in a manner explained in detail hereinbelow.

In a fully automatic film loading camera (not shown), the camera operator simply inserts the film cassette 10 into the film supply chamber 22 with the film leader 14 lying between the guide supports 26 and closes the cover door 28. In response to closure of the cover door 28, a film transport mechanism such as that disclosed in commonly assigned, co-pending U.S. patent application Ser. No. 186,772, filed Sept. 12, 1980, in the name of Donald M. Harvey and entitled "Film Threading Apparatus", the disclosure of which is incorporated herein by reference, is activated to advance the film leader 14 through the passageway 30 and into the film take-up chamber 24.

It is to be understood that the mechanism for transporting the film leader 14 to the film take-up chamber 24 forms no part of the present invention. The foregoing description of particularly useful film transport mechanisms is provided to explain how the present invention cooperates with related camera structure during film loading. However, other manual or automatic film transport mechanisms known in the art could be used.

Figure 4A:
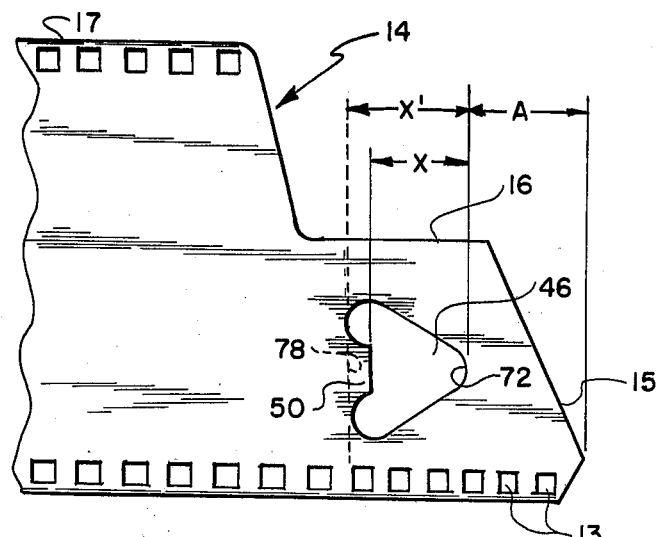
FIGS. 4A and 4B are plan views of the leading end portion of the roll film the latter also showing a plan view of a film capturing member in a film captured position.
Figure 4B:
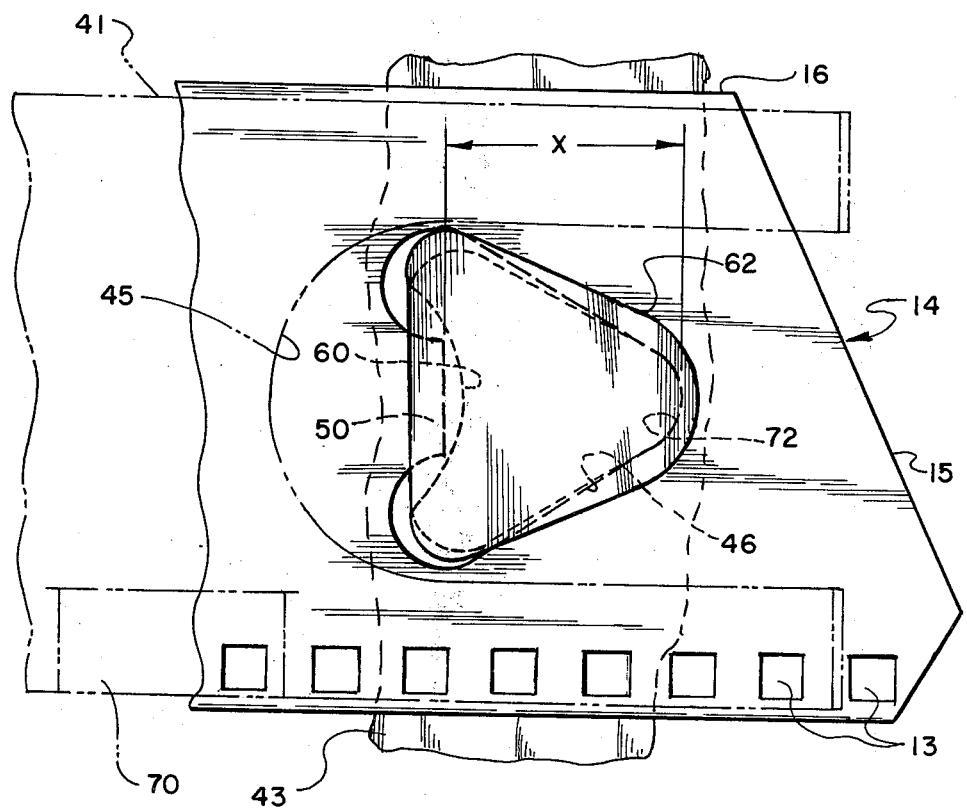

Referring now to FIGS. 4A and 4B, the film leader 14 is provided with an aperture 46 centrally located near leading end 15. A flexible tongue element 50 extends forwardly, i.e. in the direction of film advancement, into the aperture 46, providing the aperture with a lobate configuration. The leading end 15 of the film leader may be tapered as shown (i.e. forwardly in the direction of film wind) so that it may be readily propelled through the film passageway 30 and into the take up chamber 24 by an automatic film transport mechanism. A portion 16 of the film leader 14 is laterally trimmed so that its width is less than the width of the remaining major portion 17 of the film roll. As a result the leader portion 16 carries only a single row of sprocket holes 13.

The take-up spool 42 has an annular winding support surface 54 extending radially outward from the core 43 along a portion of the longitudinal core axis. The remaining portin of the core 43 in cooperation with the support surface 54 defines a trough 56 whose width is slightly greater than that of the laterally trimmed portion 16 of the film leader 14. In the trough 56, four film capturing members 44 are mounted at equally spaced intervals about the periphery of the core 43. Each film capturing member 44 consists of an upstanding pin 58 comprising a lower base surface 60, an enlarged, generally triangularly shaped upper-head surface 62, a slanted leading edge surface 64 and a trailing edge surface 66 provided with a recess 68 therein. Advantageously the maximum radius of the head surface 62 of each of the pins 58 (i.e. the combined radius of the core 43 and the pin 58) is less than the radius of the winding support surface 54, so that the capturing members 44 do not contact the light sensitive portions of the film convolutions wound thereover on the support surface 54.

Figure 3C:
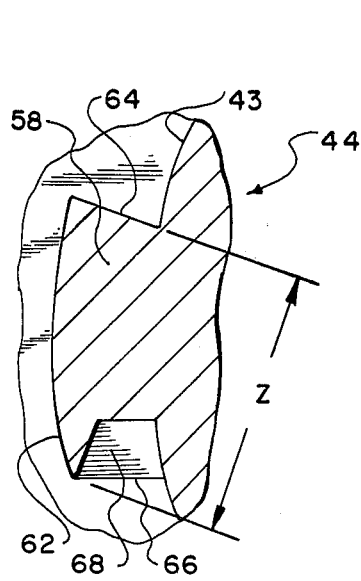
FIGS. 3A, 3B and 3C are, respectively, a plan view, a rear elevational view and a side sectional view of a film capturing member.
Figure 3A:
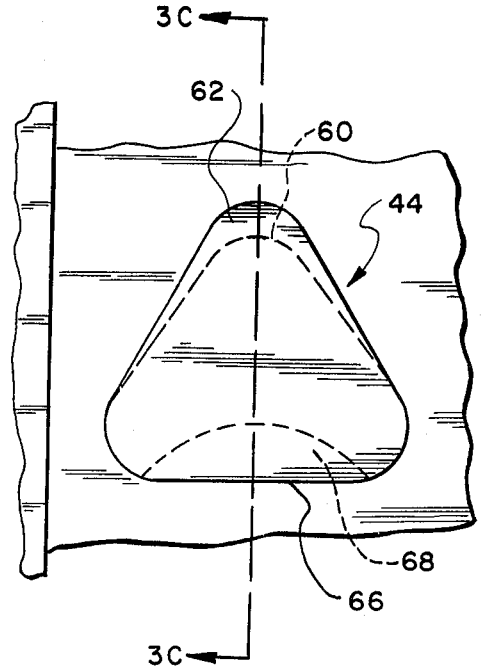
Figure 3B:
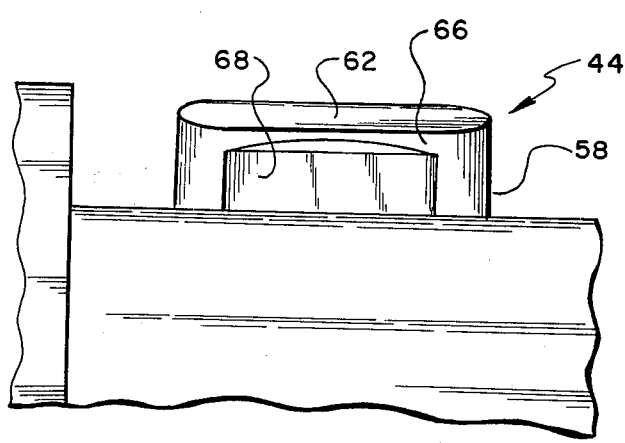

The manner in which the film capturing members 44 cooperate with the film leader aperture 46 to secure the film leader 14 to the take-up spool 42 is shown in FIGS. 3, 4 and 5.

The film leader 14 has a tendency to bend or curl in a clockwise direction as it enters the film take-up chamber 24. This curling action, in cooperation with the film guide member 41, which is pivoted about a shaft 47 mounted on the cover door 28 and biased by a spring 48 for clockwise rotation, causes the narrow, leading end portion 16 of the film leader 14 to be directed into the trough portion 56 of the take-up spool 42. The film guide member has a slot 45 in its leading end to allow the film capturing members 44 to pass therethrough during the rotation of the take-up spool 42. The face 55 of the annular winding support surface 54 serves as a film leader edge guide to assure alignment of the aperture 46 with the film capturing members 44 emerging from the slot 45.

Figure 5A:
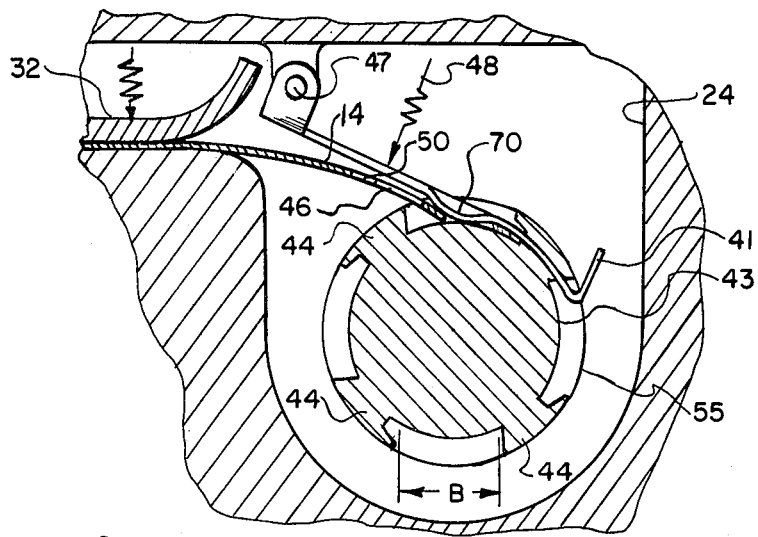
FIGS. 5A, 5B, and 5C are fragmentary sectional views illustrating the various positions for the film take-up spool and the film leader during the film securing procedure.

The rotation imparted to the take-up spool 42 causes the leading edge 64 of one of the pins 58 to enter the film aperture 46 with the tongue element 50 overlying and engaging the head surface 62 as shown in FIG. 5A.

As shown in FIGS. 4A and 5A the aperture 46 is located at a distance A from the leading end 15 of leader 14 which is less than the distance B between each of the film capturing members 44. As a result of this relative positioning of the aperture 46 and the film capturing members 44, when one of the film capturing members enters the aperture, the leading end 15 of the leader 14 cannot overlie the preceding capturing member.

In FIG. 3C, the diagonal distance between the leading edge of the lower base surface 60 and the trailing edge of upper head surface 62 is denoted Z. As best shown in FIG. 4B, when the tongue element 50 is unflexed, the lobate aperture 46 is accommodatingly smaller than the head surface 62 of the pin 58. That is to say, when the tongue element 50 is unflexed, the distance between the leading edge 72 of the film aperture 46 and the tongue element 50 (denoted X in FIG. 4A and 4B) is less that the distance Z. As a result, the head surface 62 cannot pass through the aperture 46.

Figure 5B:
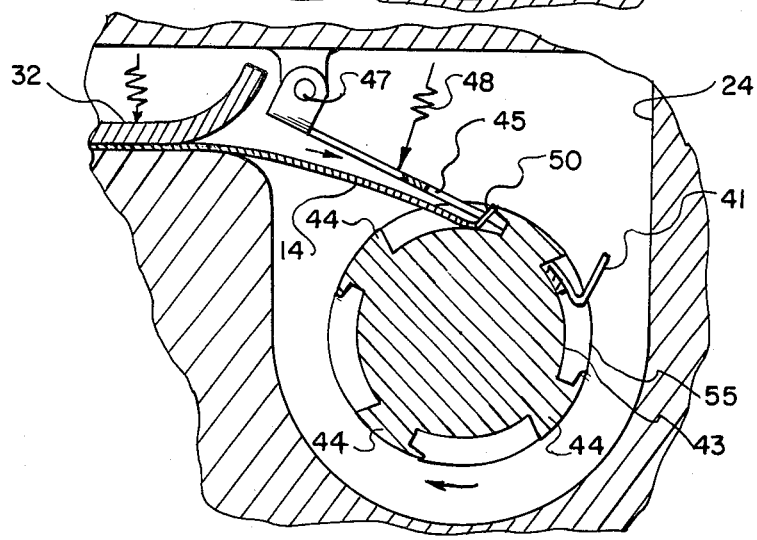
Figure 5C:
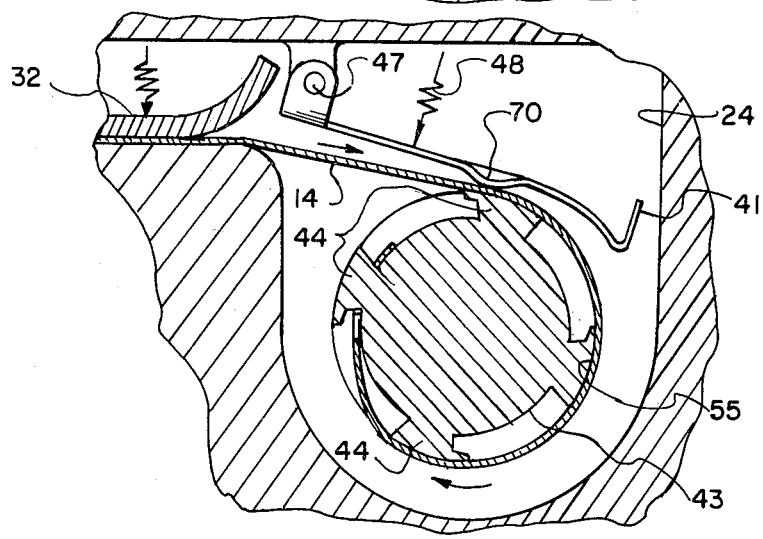

FIG. 5B shows that further rotation of the take-up spool 42 causes the film guide member 41 to slide the leading end 15 of the film leader 14 downwardly along the leading edge surface 64 of the pin 58 and into engagement with the core 43. The downward movement of the leading end 15 causes the trailing end of the aperture to be urged toward the base surface 60 so that the head surface 62 flexes the tongue element 50 upwardly out of the surrounding film plane along a flexing region 78 that is transverse to the direction of film advancement. When the tongue element 50 is flexed, the aperture 46 is accommodatingly larger than the head surface 62 of the pin 58. That is to say, when the tongue element 50 is flexed, the distance between the leading edge 72 of the aperture 46 and the tongue element 50 (denoted X in FIG. 4A) is greater than the distance Z. The head surface 62 can now pass through the aperture 46.

Continued further rotation of the take-up spool 42 (shown in FIG. 5C) allows the tongue element 50 to snap back to a substantially unflexed, capturing position in the recess 68 provided in the trailing edge surface 66 of the pin 58. This snap action securely locks the film to the take-up spool 42 so that the tongue element 50 must again be flexed to permit disengagement of the film from the capturing member 44. The film guide member 41 is also provided with a protuberance 70 located rearwardly of the slot 45 that rides upon the row of perforations 13 in the narrow portion 16 of the leader 14. The protuberance 70 thus acts to lift the guide member 41, after the attachment of the film leader 14, away from the film to avoid scratching the light sensitive portions of the film.

During the rewinding of an exposed roll of film back into the supply chamber 22 by means (not shown), the film leader 14 is pulled to a position that agins is approximately tangential to the core 43 of the take-up spool 42. This causes the tongue element 50 to flex downwardly (the opposite direction from its flexing in the film connecting procedure) thereby allowing the head surface 62 to again pass through the aperture 46 and the film leader 14 to disengage from the capturing member 44.

The invention has been described in detail with particular reference to preferred embodiments thereof, but it will be understood that variations and modifications can be effected within the spirit and scope of the invention. For example, the head surface of the film capturing member can be formed into a variety of shapes (oval, egg shaped, etc.) provided that such shape is larger than the film leader aperture when the aperture tongue element is unflexed but smaller than the film leader aperture when the aperture tongue element is flexed.

What is claimed is:

1. In a roll film having a leader provided with an aperture adapted to be entered by a capturing member of a rotatable film take-up spool to which the leader is generally tangentially delivered, the capturing member including a head surface, a leading surface and a trailing surface, at least a portion of the trailing surface being recessed relative to the head surface, the improvement comprising:

a flexible tongue extending forwardly into the aperture, said tongue being dimensioned and positioned such that upon rotation of the take-up spool, said tongue sequentially (1) overlies a portion of the head surface of the capturing member when the leading surface of the capturing member initially enters the aperture (2) is flexed by the head surface out of the plane of the surrounding leader along a flexing region that is transverse to the direction of film advancement and (3) moves to a capturing position at which said tongue is received in the recessed portion of the capturing member in a substantially unflexed condition, whereby said tongue must again be flexed to permit disengagement of the roll film from the capturing member.

2. A roll film according to claim 1 wherein said aperture is lobate.

3. A roll film according to claim 1 wherein said leader aperture is of a size such that said head surface of the capturing member cannot pass through said leader aperture when the aperture tongue is unflexed and can pass through said leader aperture when the tongue is flexed.

4. In a roll film having a leader provided with an aperture adapted to be engaged by a capturing member of a rotatable film take-up spool, the improvement comprising a flexible tongue element extending forwardly into the aperture, said tongue element being adapted to flex out of the surrounding film plane upon initial engagement with said capturing member and subsequently to snap back to a substantially unflexed condition as the capturing member fully enters the aperture and the tongue element detentably cooperates with the capturing member.

5. In a photographic camera adapted for use with roll film having a leader provided with an aperture and a flexible tongue extending forwardly into the aperture, the camera including a rotatable film take-up spool and a film capturing member mounted on the take-up spool and adapted to engage the film leader, the improvement wherein said film capturing member comprises a head surface, a leading surface and a trailing surface, at least a portion of the trailing surface being recessed relative to the head surface, the rotation of the take-up spool being adapted to sequentially cause (1) the leading surface of the capturing member to enter the leader aperture with a portion of the head surface engaging the tongue, (2) the head surface to flex the tongue out of the plane of the surrounding leader and (3) the film to move a position whereat the tongue can snap back to a substantially unflexed capturing position in the recessed porion of the trailing surface to secure the film to the take-up spool.

6. A photographic camera according to claim 5 wherein the leading surface of the film capturing member is slanted forwardly in the direction of film wind.

7. A photographic camera according to claim 5 wherein the head surface of the film capturing member is generally triangular.

8. A photographic camera according to claim 5 wherein the take-up spool has at least one annular winding support surface and a core portion bearing the film capturing member on its periphery, the combined radius of the core portion and the film capturing member being less than the radius of the winding support surface.

9. In a photographic camera adapted for use with roll film having a leader provided with an aperture and a flexible tongue extending forwardly into the aperture, the camera including a rotatable film transporting film take-up spool and a film capturing member mounted on the take-up spool and adapted to engage the aperture, the improvement wherein the film capturing member has a recess for receiving the tongue, and wherein the film capturing member is accommodatingly larger than the film aperture when the tongue is unflexed but accommodatingly smaller than the film aperture when the tongue is flexed, the film transporting rotation of said take-up spool causing the film capturing member to flex the tongue out of the surrounding film plane thereby permitting the film capturing member to pass through the film aperture and subsequently causing the film to move to a position whereat the tongue can snap back to a substantially unflexed capturing position in the recess.

10. A photographic camera according to claim 9 wherein spring means and a pivotable film guide member cooperate to urge the film leader into engagement with the film capturing member.

* * * * *

UNITED STATES PATENT OFFICE
CERTIFICATE OF CORRECTION

PATENT NO. : 4,303,325
DATED : December 1, 1981
INVENTOR(S) : Neil G. Seely

It is certified that error appears in the above-identified patent and that said Letters Patent are hereby corrected as shown below:

| | | |
|---|---|---|
| Col. 1, Line 15 | delete "in vention" and substitute therefor --invention-- |
| Col. 1, Line 28 | delete "chamber." and substitute therefor --chamber,-- |
| Col. 2, Line 10 | delete "Forther" and substitute therefor --Further-- |
| Col. 4, Line 17 | delete "portin" and substitute therefor --portion-- |
| Col. 5, Line 43 | delete "agins" and substitute therefor --again-- |
| Col. 6, Line 51 | delete "porion" and substitute therefor --portion-- |

UNITED STATES PATENT OFFICE
CERTIFICATE OF CORRECTION

PATENT NO. : 4,303,325

DATED : December 1, 1981

INVENTOR(S) : Neil G. Seely

It is certified that error appears in the above-identified patent and that said Letters Patent are hereby corrected as shown below:

Col. 2, Line 48     delete "accompaning" and substitute therefor --accompanying--

Signed and Sealed this

Twenty-third Day of March 1982

[SEAL]

Attest:

GERALD J. MOSSINGHOFF

Attesting Officer     Commissioner of Patents and Trademarks